United States Patent [19]

Kinoshita et al.

[11] Patent Number: 4,703,422
[45] Date of Patent: Oct. 27, 1987

[54] MEMORY HIERARCHY CONTROL METHOD WITH REPLACEMENT BASED ON REQUEST FREQUENCY

[75] Inventors: Toshiyuki Kinoshita, Sagamihara; Toshiaki Arai, Yokohama; Takao Sato, Kawasaki; Takashige Kubo, Hachioji; Yasufumi Yoshizawa, Tachikawa; Hiromichi Mori, Yokohama, all of Japan

[73] Assignee: Hitachi, Ltd., Tokyo, Japan

[21] Appl. No.: 687,160

[22] Filed: Dec. 28, 1984

[30] Foreign Application Priority Data

Dec. 28, 1983 [JP] Japan .................... 58-246284

[51] Int. Cl.[4] .............................. G06F 13/00
[52] U.S. Cl. ................................... 364/200
[58] Field of Search ... 364/200 MS File, 900 MS File

[56] References Cited

U.S. PATENT DOCUMENTS 4,399,503  8/1983  Hawley ........................ 364/200

Primary Examiner—Archie E. Williams, Jr.
Assistant Examiner—Michael J. Ure
Attorney, Agent, or Firm—Antonelli, Terry & Wands

[57] ABSTRACT

In a memory hierarchy system having two or more hierarchy storages of different access speeds and programs and/or data to be loaded on the hierarchy storages, an activity information acquisition unit and a display unit are provided to present information regarding selection of programs and/or data to be loaded on a higher level in memory hierarchy, a unit is provided which automatically decides loading of the programs and/or data on the higher level and executes reallocation of the programs and/or data on the basis of the information, and a unit is provided which permits the user to change the loading by using a user command. The user can make full use of these units during execution of the memory hierarchy control. In an embodiment, priority for the programs and/or data to be loaded on the higher level is calculated and decided. The programs and/or data are written into the real storage in accordance with their priority to increase the real storage hit rate upon occurrence of a next request for loading.

13 Claims, 10 Drawing Figures

FIG. 3

| PROGRAM / DATA NAME | POSITION INFORMATION FOR PERIPHERL STORAGE | POSITION INFORMATION FOR REAL STORAGE | ATTRIBUTE FLAG | STATUS FLAG | FLAG REGARDING PRESENCE OR ABSENCE OF UPDATING | PRIORITY FOR LOADING ON REAL STORAGE |
|---|---|---|---|---|---|---|
| 1 | | | | | | |
| 2 | | | | | | |
| .... | | | | | | |
| c | | | | | | |

301

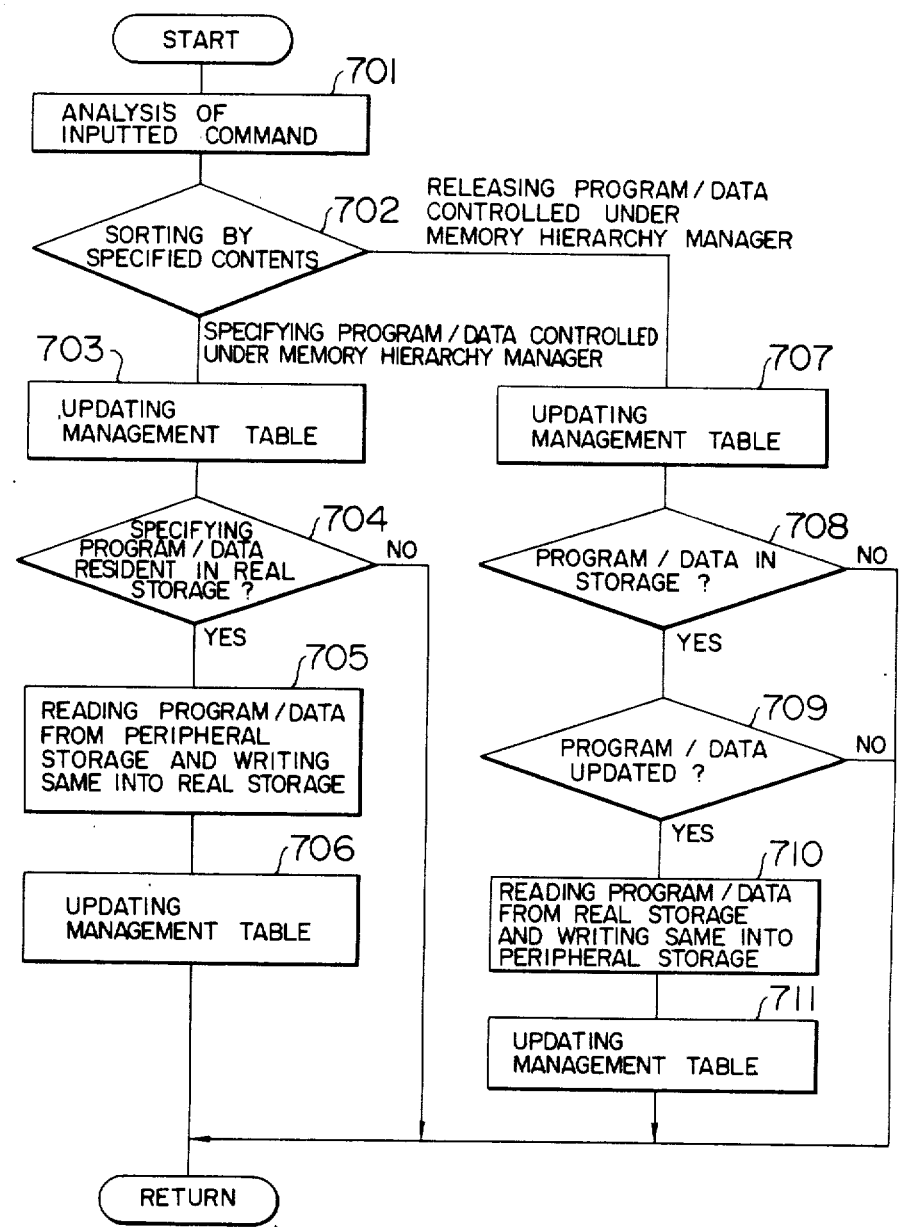

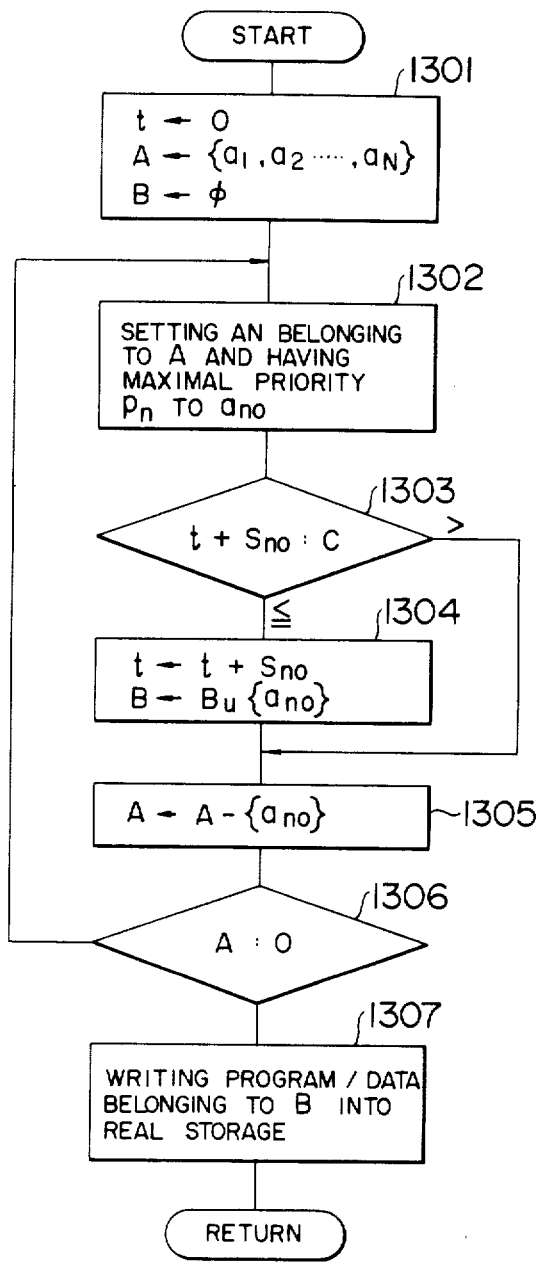

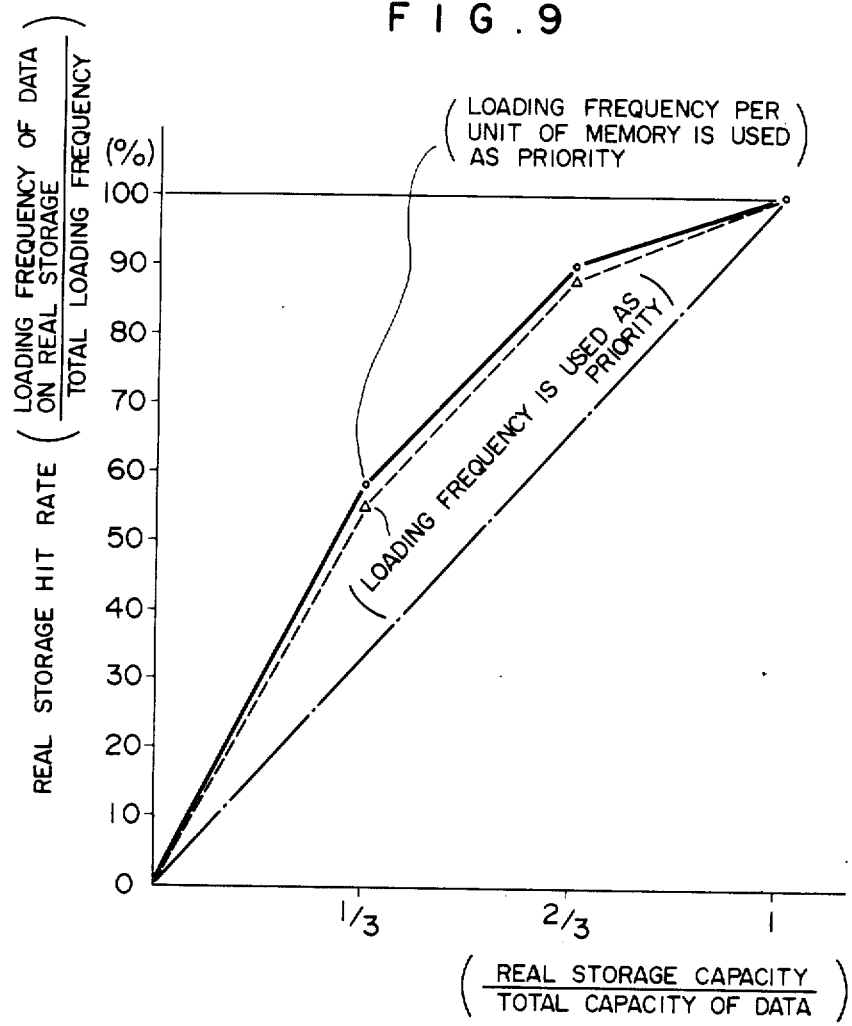

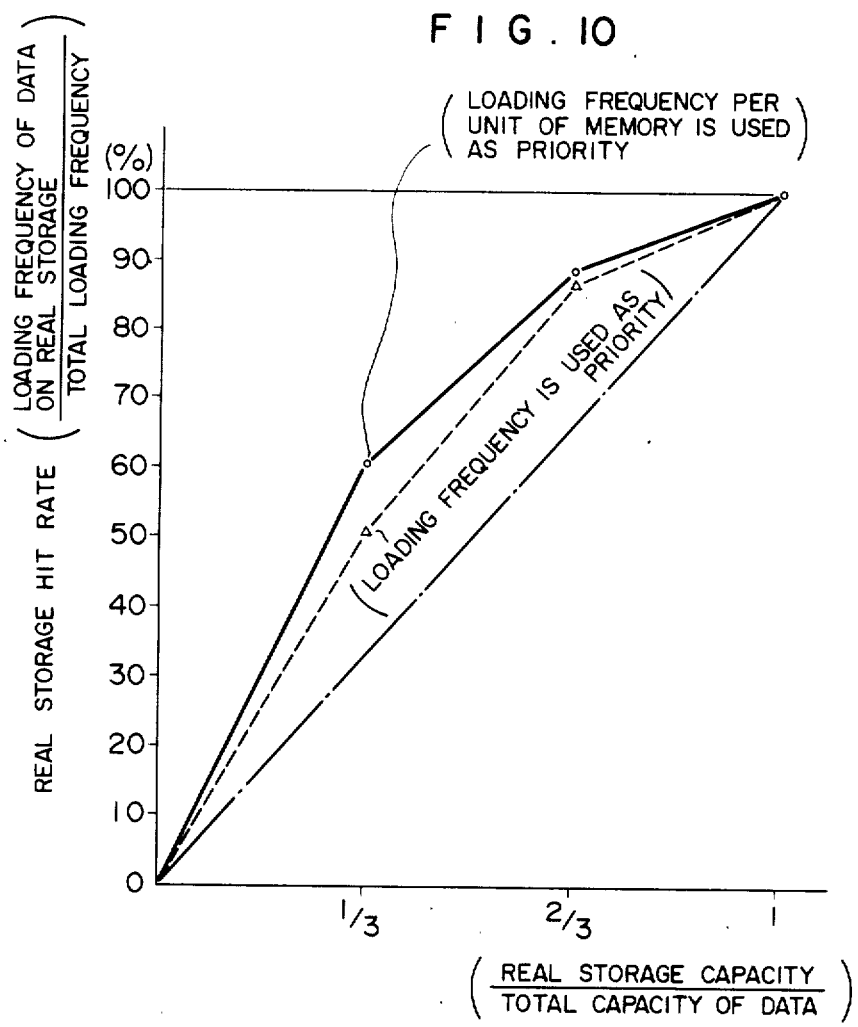

MEMORY HIERARCHY CONTROL METHOD WITH REPLACEMENT BASED ON REQUEST FREQUENCY

BACKGROUND OF THE INVENTION

1. Field of the Invention

This invention relates to a memory hierarchy control method for computers which is particularly suitable for a large scale computer system wherein the request frequency of duplex loading of programs and/or data is high and a memory hierarchy is provided which consists of a real storage of large capacity, a disk/cashe unit and a disk unit.

2. Description of the Prior Art

In the past, programs and/or data to be written into a real storage are transferred from a peripheral storage to the real storage when a request for loading of the programs and/or data occurs. Consequently, the execution time for one program is prolonged and the amount of input/output transfer increases the danger of causing frequent occurrences of bottleneck at the input/output channel.

Analogous to the present invention, a technique has been available wherein paging and inputting/outputting in a virtual memory system are made virtual and programs and/or data are loaded on a real storage in advance. This technique, however, lacks a function characteristic of the present invention by which activity information for memory hierarchy control is acquired, such an allocation in a real storage as for reducing the physical input-output is automatically decided and executed on the basis of the activity information, and the activity information is displayed to permit the user to specify particular programs and/or data residing in the real storage. For this reason, this prior art technique is disadvantageous in that efficient use of the real storage is restricted and reduction effect of the physical input-/output is poor.

In paging processing, on the other hand, a page replacement algorithm such as a least recently used (LRU) method or working set method is used wherein basically, the reference locality for program execution is utilized to load the most recently used programs and-/or data on the real storage. In contrast therewith, the present invention is featured in that the size of a unit of transfer left out of consideration in the paging processing (while one page is fixed) is much accounted of in priority.

SUMMARY OF THE INVENTION

The present invention contemplates elimination of the above drawbacks and has for its object to provide a memory hierarchy control method for a memory hierarchy system having a plurality of hierarchy levels, wherein programs and/or data of higher priority are loaded at a higher speed, and higher level hierarchy storage to which a central processing unit is directly accessible, whereby the processing for transfer of the programs between the hierarchy storages is reduced and the execution speed of the programs is increased to ultimately reduce the execution time of the programs.

To accomplish the above object, according to the invention, in a memory hierarchy system having two or more hierarchy storages of different access speeds and programs and/or data loaded on the hierarchy storages, the loading request generation to the programs and/or data during operation of the system is monitored and recorded, and programs and/or data to be loaded on a higher speed hierarchy storage are selected on the basis of the recorded information so as to be loaded on the higher speed hierarchy storage of the memory hierarchy in advance.

BRIEF DESCRIPTION OF THE DRAWINGS

FIG. 3 shows a management table used in the memory hierarchy control system according to the invention;

FIGS. 4 to 7 are flow charts useful in explaining the present invention, of which FIG. 4 is a flow chart when a request for execution of a program occurs, FIG. 5 is a flow chart illustrative of a reallocation processing, FIG. 6 is a flow chart illustrative of a processing for specifying/releasing by a user command the programs and-/or data residing in a real storage, and FIG. 7 is a flow chart illustrative of a processing for specifying/releasing by the user command the programs and/or data controlled under memory hierachy;

FIG. 8 is a flow chart illustrative of a processing of the invention for writing the programs and/or data into the real storage in accordance with priority;

FIG. 9 is a graph for comparison of priority for real storage write data having sizes of from 20 to 40; and FIG. 10 is a graph for comparison of priority for real storage write data having sizes of from 1 to 60.

DESCRIPTION OF THE PREFERRED EMBODIMENTS

The invention will now be described by way of example.

(FIRST EMBODIMENT)

Figure 1:
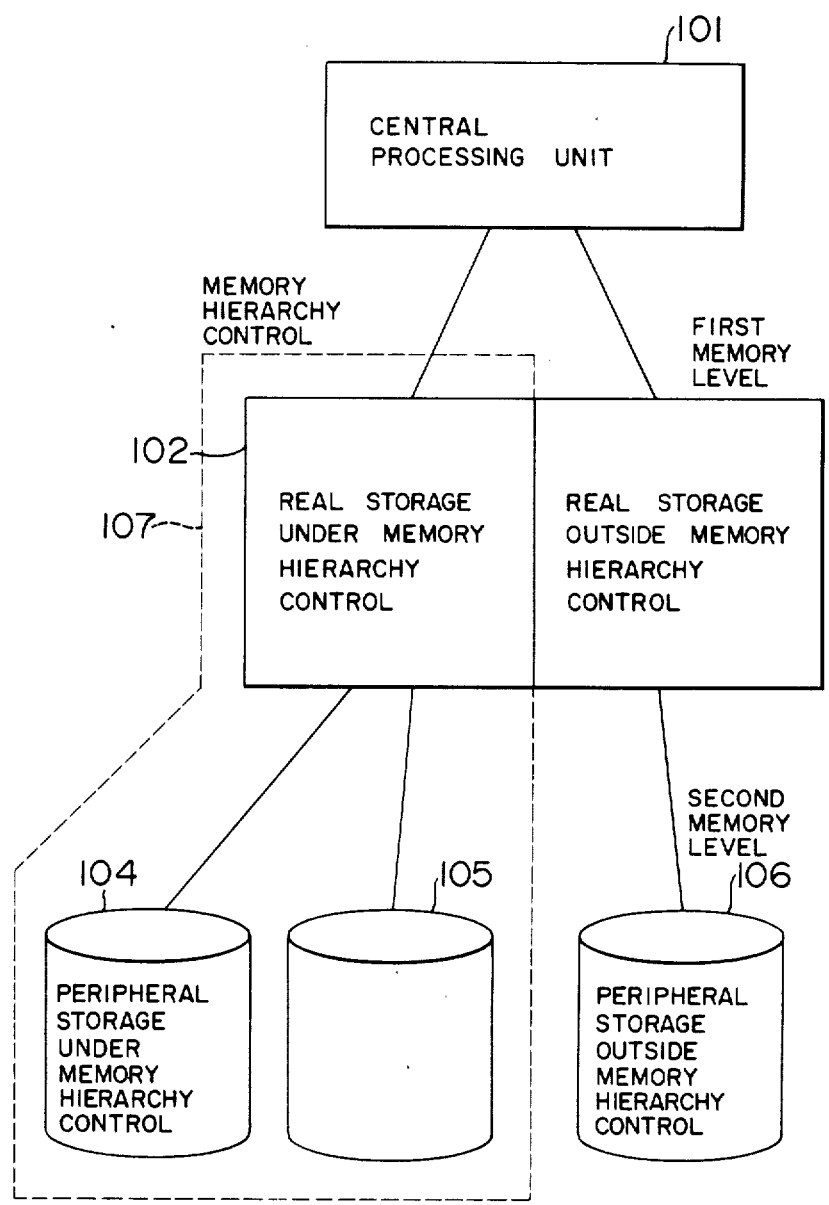
FIG. 1 is a schematic view of a memory hierarchy control system according to an embodiment of the invention.
Figure 2:
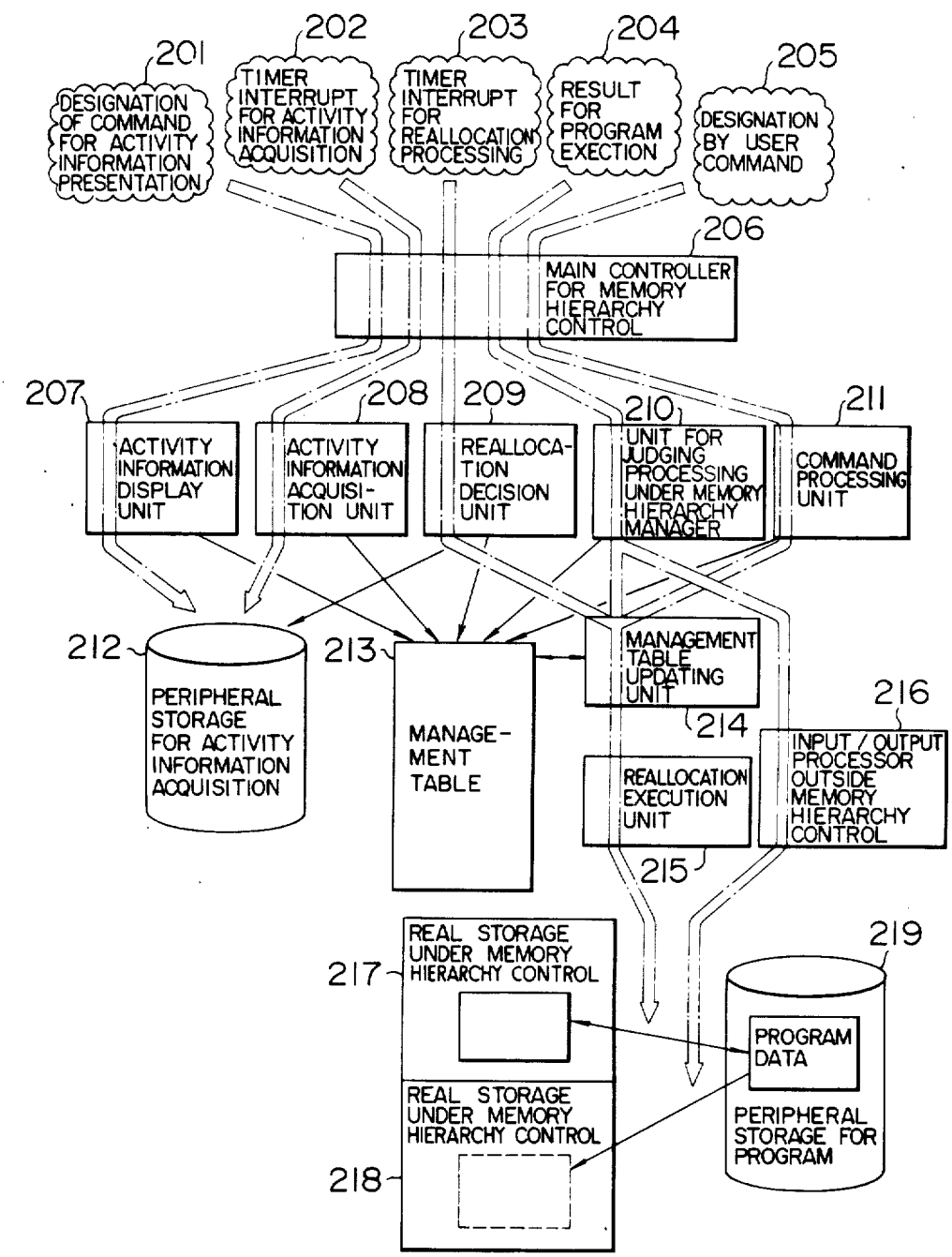
FIG. 2 shows various units participating in the memory hierarchy control and processing associated therewith.

FIG. 1 shows the construction of a first embodiment. In this embodiment, real storages 102 and 103 are provided as high speed hierarchy storages to which a central processing unit 101 is directly accessible and peripheral storages (disk units) 104, 105 and 106 are provided as low speed hierarchy storages to which the central processing unit 101 is not directly accessible. Reference numeral 107 denotes a system under memory hierarchy control. A memory hierarchy control system according to the invention must fulfill the following functions (FIG. 2):

(1) To determine, whether the programs and/or data being subject to a request for loading are controlled under memory hierarchy manager;

(2) To decide the programs and/or data to be loaded on the real storages;

(3) To collect activity information regarding the memory hierarchy control;

(4) To display the activity information by a user command; and (5) To specify/release the programs and/or data residing in the real storages and to specify/release the programs and/or data controlled under memory hierarchy manager by the user command. To realize these functions, a management table is prepared which indicates under what status the memory hierarchy control currently manages individual programs and/or data (FIG. 3). The management table contains names of the programs and/or data, and information regarding positions of the programs and/or data in the peripheral storages. Additionally, when the programs and/or data are loaded on the real storages, it can be specified by the user command whether the programs and/or data are residing in the real storages or in the virtual storage, and the management table contains a flag indicative of which attribute the programs and/or data currently take, a status flag indicative of whether the programs and/or data which are residing in the virtual storage are currently present in the real storages or not, a flag indicative of whether the programs and/or data are finally written into the real storages and then updated, and priority for loading the programs and/or data on the real storages.

Examples of various functions of the memory hierarchy control will now be detailed.

Figure 4:
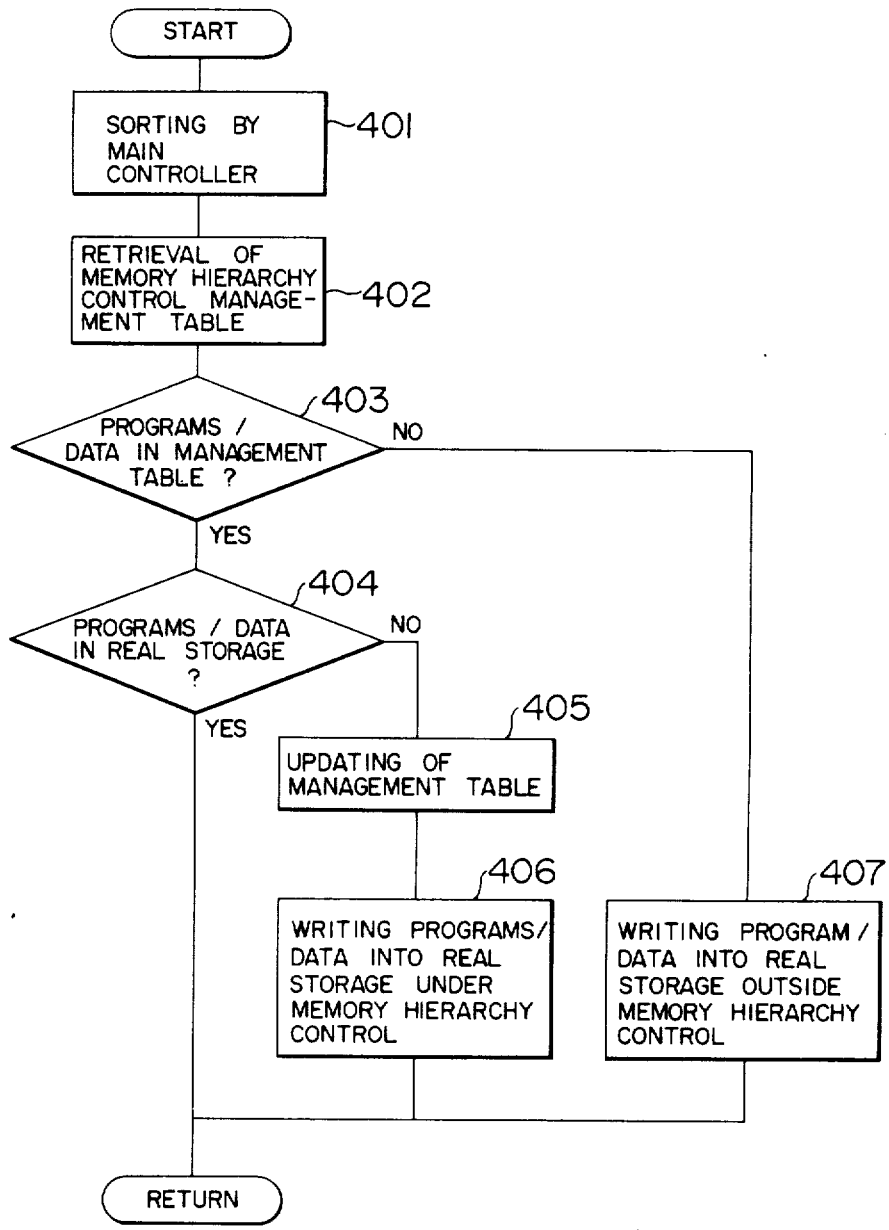

(1) Upon Occurrence of Request for Execution of Programs and/or Data (FIG. 4)

When a request for execution of programs and/or data occurs, the controlling is first put under the control of a unit which determines whether the programs and/or data are to be controlled under memory hierarchy management. In this unit, the management table is retrieved and a determination is made as to whether the programs and/or data are present in the management table. If not, the programs and/or data are not under the memory hierarchy control and they are written into the real storage 103 outside the memory hierarchy control by means of an ordinary input processor. If present, it is then determined as to whether the programs and/or data have already been written into the real storage under the memory hierarchy control. If the programs and/or data are unloaded on the real storage, the status flag in the management table will be updated and the programs and/or data will be written into the real storage by means of a reallocation execution unit. If the programs and/or data have already been loaded on the real storage, the memory hierarchy control will not proceed and the control is executed by the programs and/or data.

In this case, if the programs and/or data are not under the memory hierarchy control and if they are under the memory hierarchy control but unloaded on the real storage, the execution time of the programs and/or data cannot be reduced. However, the programs and/or data under the memory hierarchy control and loaded on the real storage can be executed as they are, thus reducing the execution time.

Figure 5:
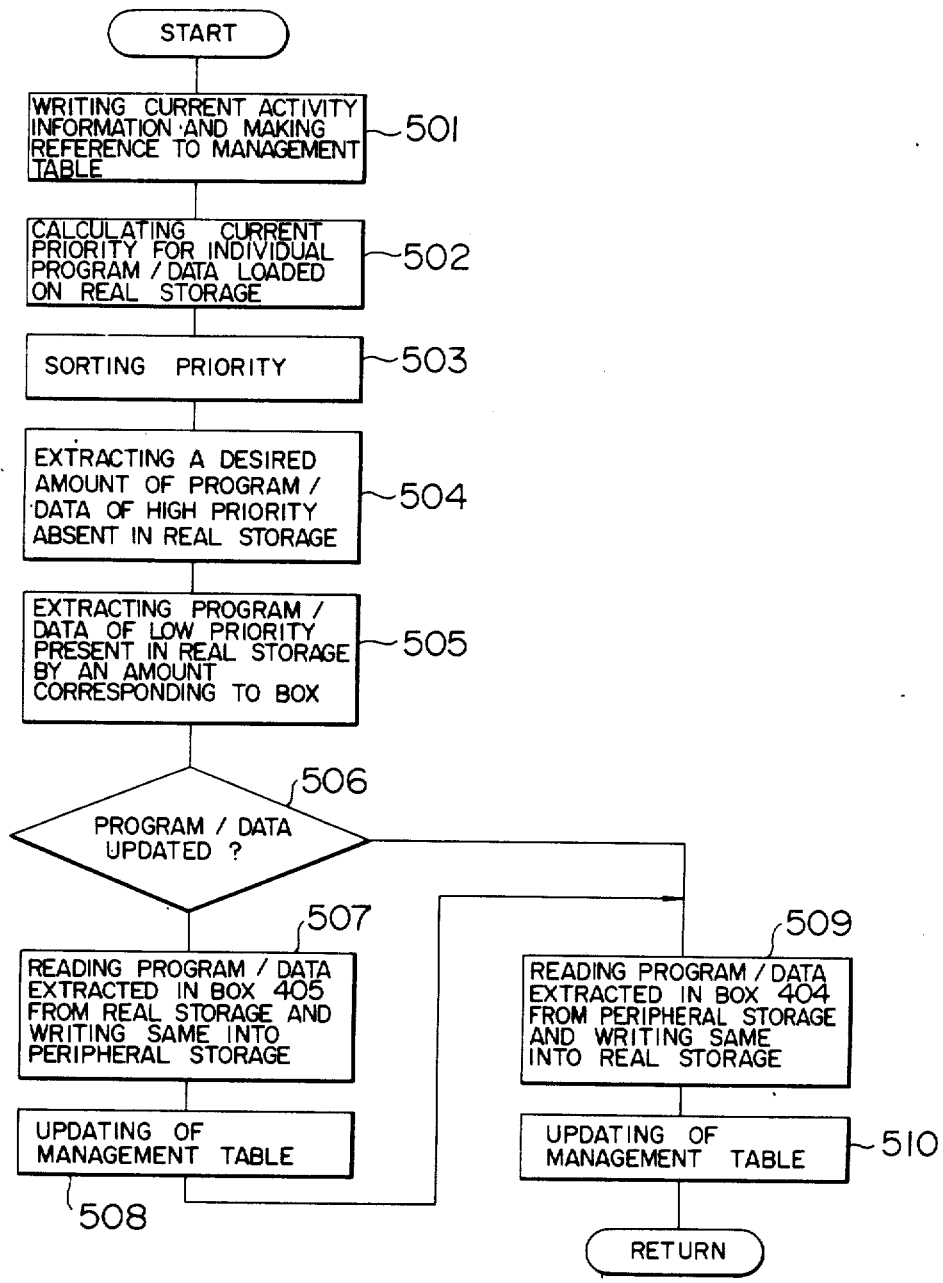

(2) Upon Occurrence of Timer Interrupt for Reallocation (FIG. 5)

Reallocation for deciding what programs and/or data have been loaded on the real storage is periodically started by a timer interrupt, exactly asynchronously with the loading of the programs and/or data. This starting interval is termed reallocation interval. When this processing is started, the controlling proceeds to a reallocation decision unit. The reallocation decision unit calculates from current contents of the management table and a current activity information history priority for individual programs and/or data to be written into the real storage. Then, on the basis of the calculated priority, only a desired amount of programs and/or data are extracted from programs and/or data which have higher priority but are unloaded on the real storage and thereafter, a corresponding amount of programs and/or data of lower priority, while loaded on the real storage, are extracted.

The reallocation execution unit exchanges the programs and/or data of lower priority extracted by the reallocation decision unit with the programs and/or data of higher priority in order for the latter to be written into the real storage. In this procedure, data which have been updated during their presence in the real storage must be written into the peripheral storages. In parallel with the exchange processing, the status flag in the management table indicative of the presence or absence of the programs and/or data in the real storage is updated by means of a management table updating unit.

Only the programs and/or data residing in the virtual storage are subject to the reallocation processing but the programs and/or data residing in the real storage which are required to be always present in the real storage are put aside from the reallocation processing.

(3) Collection of Activity Information Regarding Memory Hierarchy Control

The activity information regarding the memory hierarchy control is related to the following three proceedings:

(i) Sampling of status of the programs and/or data governed by the periodical timer-interrupt;
(ii) Acquisition of user command history; and
(iii) Recordation of the fact that a request for locating of the programs and/or data occurs.

The activity information purporting either of the three proceedings is outputted to the peripheral storage by way of an activity information acquisition unit. Of various kinds of information described above, the activity information relevant to item (i) is used for the reallocation decision unit to extract the programs and/or data to be loaded on the real storage. The activity information relevant to items (i) and (iii) is used as a criterion according to which the user determines whether the programs and/or data are to be residing in the real storage.

(4) Display of Activity Information by User Command

Information specified by a user command is outputted to enable the user to select the programs and/or data to be residing in the real storage from the programs and/or data under the memory hierarchy control. Contents of this information mainly correspond to items (i) and (iii) above and to current contents of the management table, and are displayed by means of an activity information display unit.

Figure 6:
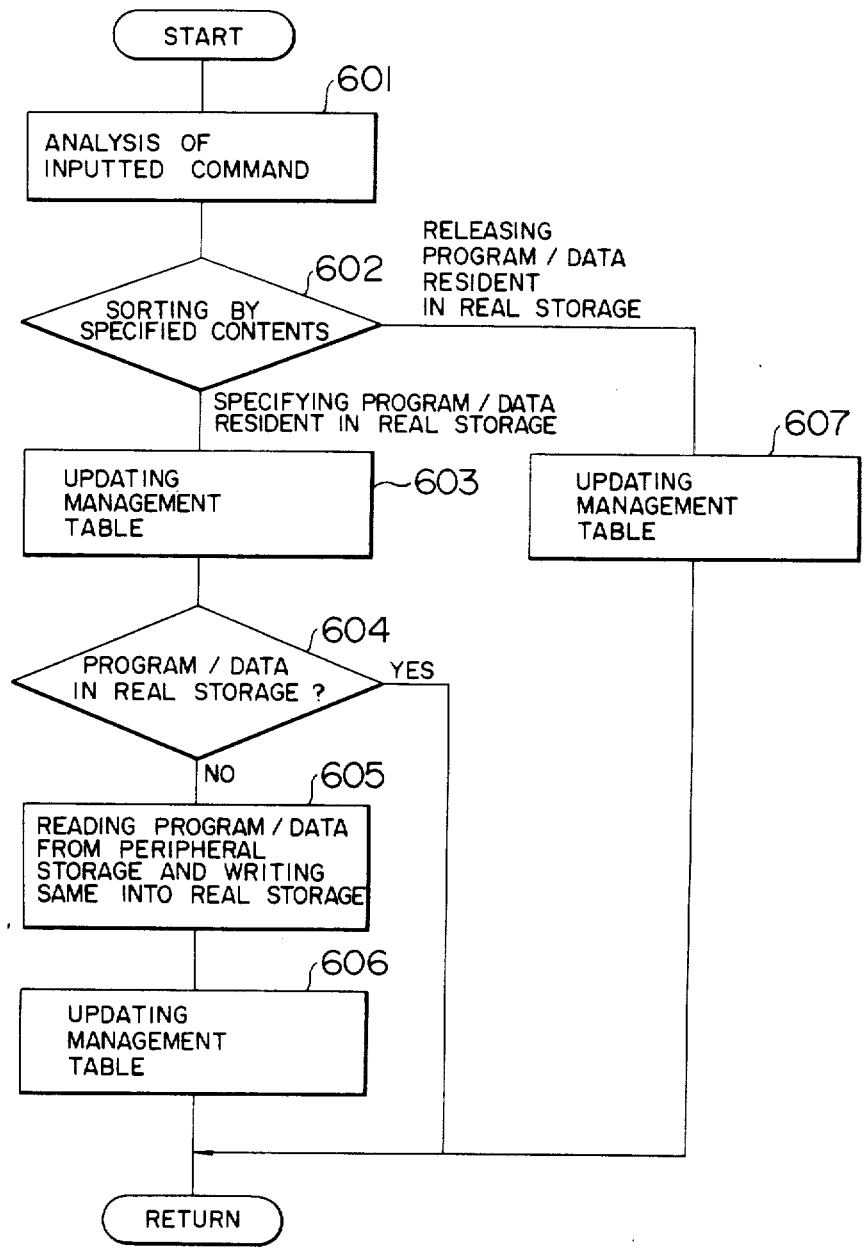

(5) Specifying/Releasing the Programs and/or Data Resident in Real Storage and Specifying/Releasing and Programs and/or Data Controlled Under Memory Hierarchy Manager by User Command By inputting a user command, the user can specify particular programs and/or data residing in the real storage or release the specified particular programs and/or data (FIG. 6). In addition, by using the user command, programs and/or data which have not been controlled under memory hierarchy manner can be put into the management or the programs and/or data which have been controlled under memory hierarchy manager can be placed outside the management (FIG. 7).

The following exemplary illustration specifying/releasing the programs and/or data will now be described. When the user command is inputted, the controlling proceeds to a command processor and either specifying the programs and/or data residing in the real storage or releasing the programs and/or data residing in the real storage is stored. In case where the programs and/or data residing in the real storage are to be released, the attribute flag in the management table is changed. By this, the programs and/or data then become an object to be reallocated by means of the reallocation decision unit and may possibly be purged out of the real storage. In case where the programs and/or data residing in the real storage are to be specified, the attribute flag is updated to specify the programs and/or data residing in the real storage. If, in this case, the programs and/or data are not present in the real storage they will be written into the real storage. Thus, the programs and/or data in question are put aside from reallocation and thereafter residing in the real storage.

(SECOND EMBODIMENT)

A second embodiment of the invention will now be described. The second embodiment is principally similar to the first embodiment and is particularly concerned with decision and execution of programs and/or data to be loaded on the real storage. The programs and/or data to be written in advance into the real storage must be limited to those which are predictably expected to be loaded frequently in the near future. But it is impossible to know exactly the request frequency for loading of the programs and/or data. Considering the probability of the loading of the programs and/or data, it may generally be concluded that programs and/or data which experienced frequent loading in the past will possibly be loaded frequently also in the future. It is therefore conceivable to maximize a statistical quantity representative of a loading request frequency of programs and/or data written in the real storage. To this end, since the past loading request frequency of individual programs and/or data is known, the sum of the past loading request frequencies may be examined in respect of all sets of programs and/or data selected from the programs and/or data under the memory hierarchy control and having the total size which is within the capacity of the real storage, thereby finding out a case where the statistical quantity is maximized. Such a method, however, requires a great processing time for its execution and is difficult to fulfill its performance.

A practically feasible method is then conceived wherein priority is allotted to individual programs and/or data and written into the real storage, and sets of programs and/or data are selected from programs and/or data having higher priority until the total size of the selected sets reaches the capacity of the real storage. This method can reduce the processing time and is easy to practice.

FIG. 8 shows proceedings for selecting programs and/or data to be written into the real storage by using the priority according to the teachings of this embodiment. In a flow chart of FIG. 8, N: the total number of the programs and/or data under the memory hierarchy control, $A_n$: the programs and/or data under the memory hierarchy control, where n=1, 2, . . . , N, sn: size of $A_n$, fn: loading frequency of $A_n$, pn: priority allotted to $A_n$, and C: capacity of the real storage under the memory hierarchy control.

The priority to be written into the real storage may be related to the following factors:

(1) The loading frequency fn of individual programs and/or data loaded thus far (that is, pn=fn); and (2) The loading frequency of individual programs and/or data load on a unit of memory (that is, pn=fn/sn).

Effectiveness of both the factors will be described later. The factor of item (2) above has preferable properties as follows:

[Property 1]

The property relevant to item (2) above has a high probability of providing a solution which approximates an optimal selection that maximizes the sum of loading frequencies of the selected programs and/or data.

[Property 2]

When the size sn of the programs and/or data is fixed, the priority relevant to item (2) provides an optimal solution.

[Property 3]

When the loading frequency fn of the programs and/or data is fixed, the priority relevant to item (2) provides an optimal solution.

To evaluate effects of priority according to this embodiment, evaluation models are determined in accordance with the random number of the size of individual programs and/or data within a range of designated values and the random number of the loading request frequency of individual programs and/or data within a range of from 1 to 1000. Accordingly, there is no correlation between the size and the loading frequency of the programs and/or data. A designated number of the programs and/or data are generated and compared with each other within designated memory capacity in accordance with the cases:

(1) Where the loading frequency fn is selected with preferance to larger values;

(2) Where the loading frequency per unit of memory fn/sn is selected with preference to larger values; and (3) Where the programs and/or data are selected at random.

Analytical results are graphically illustrated in FIGS. 9 and 10. Results obtained when the size of the programs and/or data has a random number of 10 to 20 (when the variance of size is small) are shown in FIG. 9, and results obtained when the size of the programs and/or data has a random number of 1 to 60 (when the variance of size is large) are given in FIG. 10. In these figures, dotted curves particularly represent average values obtained when the programs and/or data are extracted at random without taking the priority into consideration. As will be seen from FIGS. 9 and 10, the hit rate can be improved by 53 to 80% at the most where the priority related to both the loading frequency and loading frequency per unit of memory is used, as compared to the case where the programs and/or data are extracted at random. Especially, it should be understood that the method using the loading frequency per unit of memory is the most efficient. It should thus be appreciated that the priority having relevancy to both factors provides effective criteria for selection of the programs and/or data.

As has been described, according to the invention, programs and/or data of higher priority to be loaded more frequently can be loaded on the hierarchy storage of higher level in memory hierarchy and of higher speed to which the central processing unit is directly accessible, thereby reducing the execution time of the programs and/or data. Further, the employment of the memory hierarchy control system of the invention adapted for automatic execution of reallocation can prevent degradation of operation capability of computers and can facilitate the operation of computers by displaying the activity information and changing attribute of the programs and/or data through the use of the user command. In addition, the memory hierarchy system of the invention systematically manages multiple levels of memory hierarchy typically having different characteristics to thereby provide effective means for the maintenance of computers.

We claim:

1. A memory hierarchy control method for a memory hierarchy system having two or more hierarchy storages of different access speeds, wherein the programs and/or data to be loaded in said hierarchy storages are characterized according to their priority, said method comprising the steps of:

monitoring and recording the loading request generation with respect to the programs and/or data that is to be operated in said system to calculate the related priority of said programs and/or data for being loaded into the respective hierarchy storages on the basis of said loading request generation; and selecting higher priority programs and/or data to be loaded on a higher speed hierarchy storage on the basis of the recorded information as follows: when the priority of a program and/or data residing on the higher speed hierarchy storage is lower than the priority of a program and/or data residing on the lower speed hierarchy storage, a program and/or data on the higher speed hierarchy storage is selected during each predetermined execution time to effect the transfer of the latter program and/or data into the higher speed hierarchy storage and to transfer the former program and/or data into the lower speed hierarchy storage.

2. A memory hierarchy control method according to claim 1, further comprising the steps of:

presenting information regarding the behavior of the recorded programs and/or data to the user based upon priority, by preparing a management table, such that programs and/or data of higher priority to be loaded more frequently can be loaded on the hierarchy storage of higher level in the memory hierarchy and of higher speed resulting in direct accessibility to a central processing unit, thereby reducing the execution time of the programs and/or data; and causing the user to select programs and/or data on the basis of the presented information so as to load the selected programs and/or data of higher priority on the higher speed hierarchy storage.

3. A memory hierarchy control method according to claim 1, wherein the lower speed hierarchy storage is connected to the higher speed hierarchy storage to transfer a program and/or data required by a loading request generation from a processor when the required program and/or data is not on the higher speed hierarchy storage whereby the processor is accessible through the higher speed hierarchy storage.

4. A memory hierarchy control method according to claim 3, further comprising the steps of:

presenting information regarding the behavior of the recorded programs and/or data to the user based upon priority, by preparing a management table, such that programs and/or data of higher priority to be loaded more frequently can be loaded on the hierarchy storage of higher level in the memory hierarchy and of higher speed resulting in direct accessibility to a central processing unit, thereby reducing the execution time of the programs and/or data; and causing the user to select programs and/or data on the basis of the presented information so as to load the selected programs and/or data of higher priority on the higher speed hierarchy storage.

5. A memory hierarchy control method according to claim 3, wherein the priority for the programs and/or data is related to the loading request frequency of individual programs and/or data loaded thus far.

6. A memory hierarchy control method according to claim 5, wherein the loading request frequency is the number of loading requests generated from a prior selection timing point to the the next selection timing point.

7. A memory hierarchy control method according to claim 6, wherein the priority for the programs and/or data is based upon the ratio of a loading request frequency to a memory size required by individual programs and/or data loaded in the storage thus far.

8. A memory hierarchy control method according to claim 3, wherein the monitoring is executed by a previously specified part of a program and/or data of all the programs and/or data to be executed in the system.

9. A memory hierarchy control method according to claim 3, wherein said each predetermined execution time has a fixed time interval.

10. A memory hierarchy control method according to claim 1, wherein the priority for the programs and/or data is based upon the ratio of a loading request frequency to a memory size required by individual programs and/or data loaded in the storage thus far.

11. A memory hierarchy control method according to claim 10, wherein the loading request frequency is the number of loading requests generated from a prior selection timing point to the next selection timing point.

12. A memory hierarchy control method according to claim 1, wherein the monitoring is executed by a previously specified part of a program and/or data of all the program and/or data to be executed in the system.

13. A memory hierarchy control method according to claim 1, wherein said predetermined execution time has a fixed time interval.

* * * * *